United States Patent Office 3,028,513
Patented Apr. 3, 1962

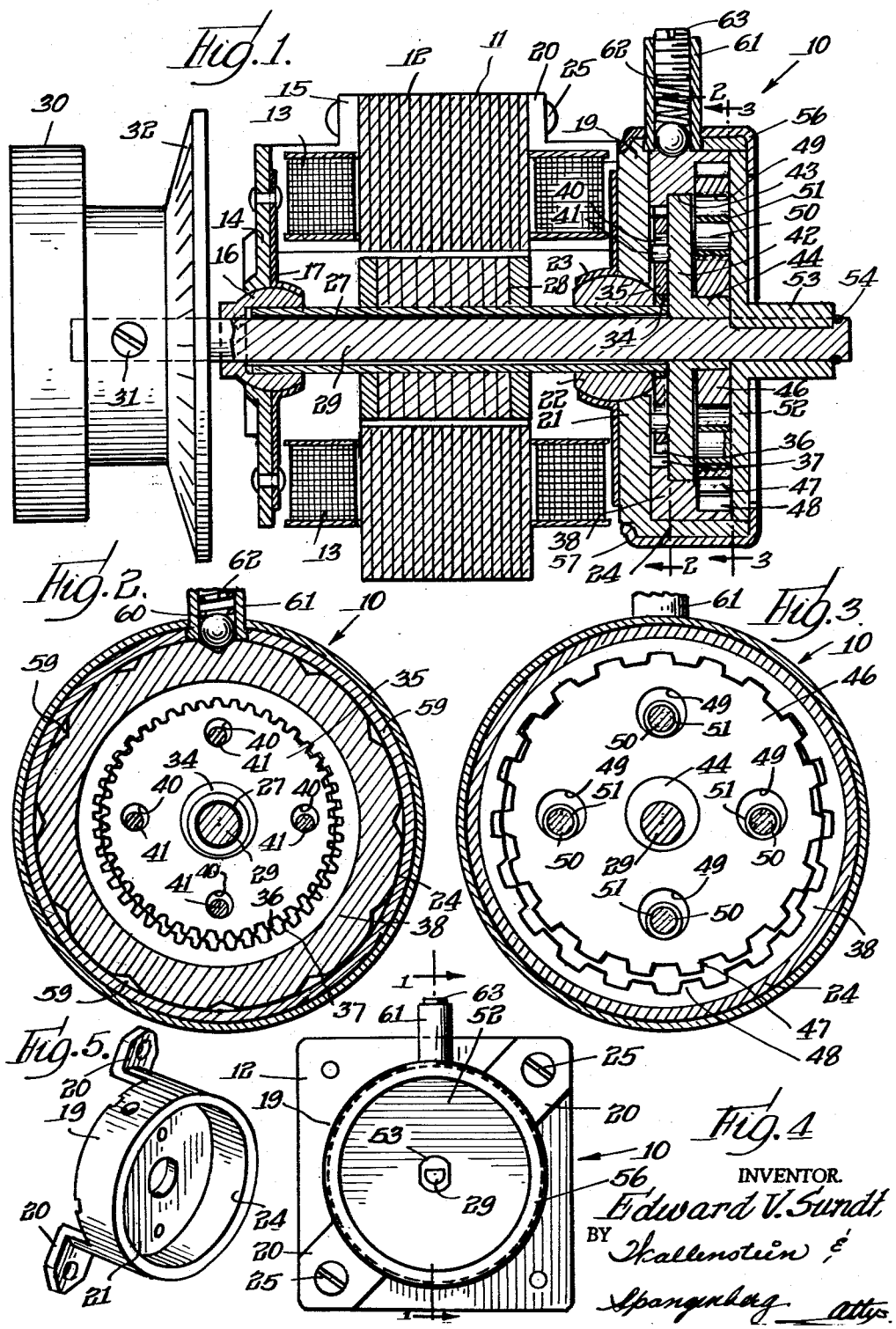

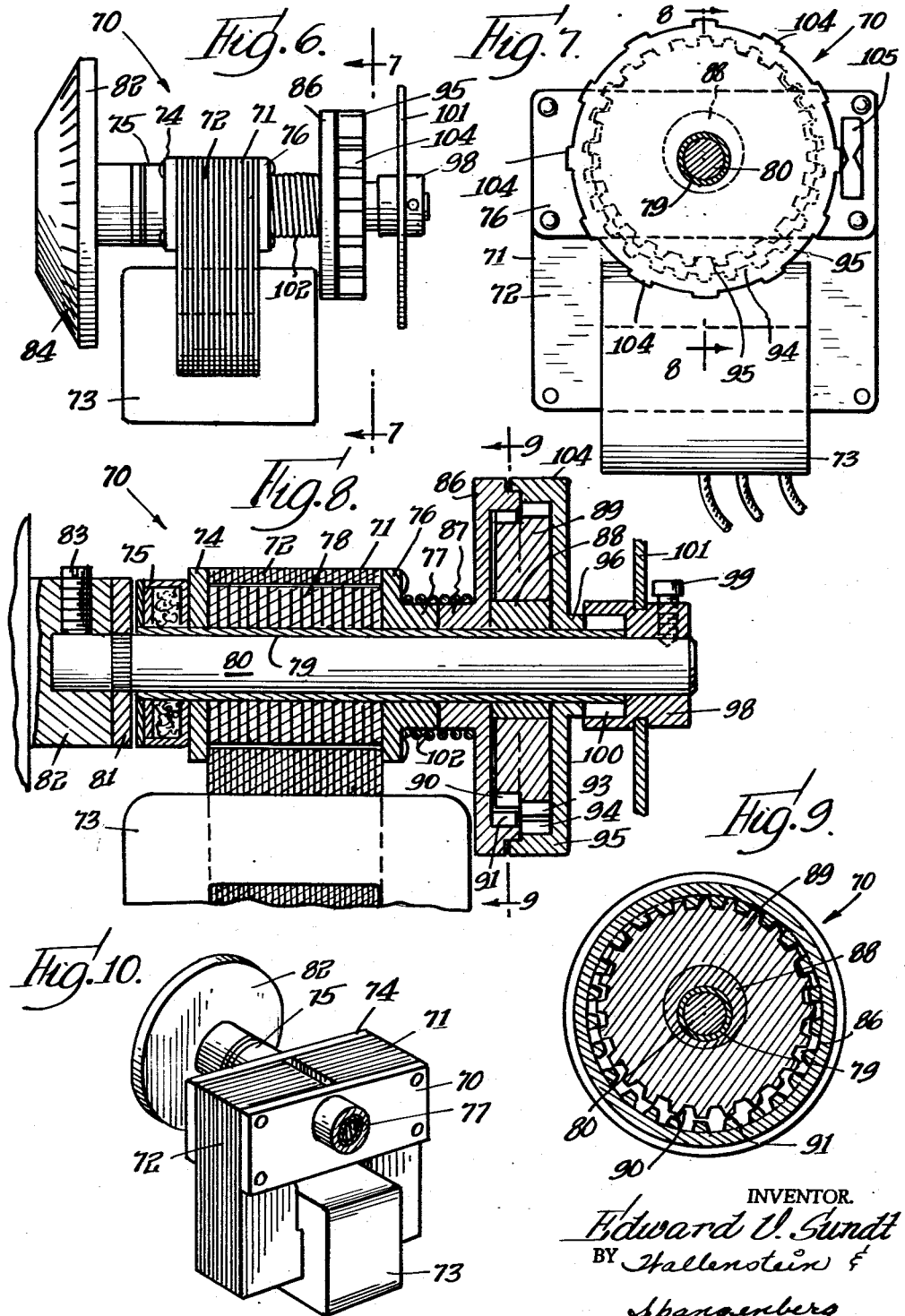

3,028,513
MOTORIZED DIAL CONTROL MECHANISM
Edward V. Sundt, 118 Sterling Lane, Wilmette, Ill.
Filed July 29, 1959, Ser. No. 830,321
12 Claims. (Cl. 310—83)

The principal object of this invention is to provide a motorized dial control mechanism for positioning a device automatically by means of an electric motor which may be remotely controlled and also manually by manually manipulating a dial connected to the device, the dial always indicating the position of the device. The electric motor operates through a differential gear reducer for positioning the device and friction means associated with the differential gear reducer allows for an overriding action which permits the device to be manually positioned by the dial. Indexing means are also provided for positive positioning of the device to be positioned.

The motorized dial control mechanism of this invention may power position and manually position many different kinds of devices, such as, for example, electrical potentiometers, variable resistances, variable condensers, variable transformers, single and multiple switches, governing dials in servo-mechanisms, and the like. It is also particularly useful in controlling the position of a tuner in a television set.

Further objects of this invention reside in the details of construction of the motorized dial control mechanism and in the cooperative relationships between the component parts thereof.

Other objects and advantages of this invention will become apparent to those skilled in the art upon reference to the accompanying specification, claims and drawings in which:

FIG. 1 is a vertical sectional view through one form of the motorized dial control mechanism of this invention and being taken substantially along the line 1—1 of FIG. 4;

FIG. 2 is a vertical sectional view taken substantially along the line 2—2 of FIG. 1;

FIG. 3 is a vertical sectional view taken substantially along the line 3—3 of FIG. 1;

FIG. 4 is an end elevational view of the motorized dial control mechanism looking from the right of FIG. 1;

FIG. 5 is a perspective view of the differential gear housing illustrated in FIG. 1;

FIG. 6 is a side elevational view of another form of the motorized dial control mechanism of this invention;

FIG. 7 is a vertical sectional view taken substantially along the line 7—7 of FIG. 6;

FIG. 8 is a vertical sectional view taken substantially along the line 8—8 of FIG. 7;

FIG. 9 is a vertical sectional view taken substantially along the line 9—9 of FIG. 8; and FIG. 10 is a partial perspective view of FIG. 6.

Referring first to FIGS. 1–5, one form of the motorized dial control mechanism of this invention is generally designated at 10. It includes an electric motor 11 such as a 4-pole reversible electric motor which utilizes a condenser (not shown) for providing operation of the motor in one direction or the opposite direction. The motor 11 includes a field structure having laminations 12 carrying coils 13. A bracket 14 is arranged at one side of the laminations 12 and is provided with ears 15 by which it is secured to the laminations 12. The bracket 14 carries a bearing 16 which is held in place by a plate 17 secured to the bracket 14. A housing member 19 is arranged on the other side of the laminations 12 and it is provided with ears 20 for securing the same to the laminations 12. The housing member 19 is provided with a wall 21 in which is arranged a bearing 22, the bearing being held in place by a plate 23 secured to the housing wall 21. The housing member 19 is also provided with a cylindrical portion 24 which is concentric with the central axis of the bearing 22. The laminations 12 are secured together and the bracket 14 and housing member 19 are secured to the laminations 12 by means of screws 25.

A motor rotor 28 is arranged within the laminations and it is carried by a hollow sleeve shaft 27 which is journalled for rotation on the bearings 16 and 22. Thus, as the coils 13 are appropriately energized, the motor rotor 28 is rotated in one direction or the opposite direction for rotating the sleeve shaft 27. Arranged within the sleeve shaft 27 is a control shaft 29 which is journalled for rotation adjacent one end by the bearing 16 and which is journalled for rotation adjacent its other end by an intermediate member 42. Thus, the control shaft 29 is journalled independently of the motor sleeve shaft 27, a clearance between the shafts 27 and 29 being provided. A dial 30 is secured to one end of the control shaft 29 as by a set screw 31 and the dial 30 is provided with an indicating portion 32 for indicating the rotative positions of the control shaft 29.

An eccentric 34 is secured to the end of the motor sleeve shaft 27 and a rotor 35 is rotatably mounted on the eccentric. The rotor 35 is provided with teeth 36 which mesh with teeth 37 in an annulus member 38 which is rotatably mounted in the cylindrical portion 25 of the housing member 19. Normally, the annulus member 38 is held against rotation, in other words, stationary. As the eccentric 34 is rotated by the motor rotor sleeve shaft 27, the rotor 35 is oscillated and, due to the meshing engagement of the teeth 36 and 37, it is also rotated. As for example, the teeth 37 in the annulus member 38 number 45 and the teeth 36 on the rotor 35 number 44, thereby providing for a speed reduction ratio of 44 to 1.

The rotor 35 is provided with a plurality of holes 40 (4 such holes being shown for purposes of illustration) which receive pins 41 of an intermediate member 42 which is journalled for rotation concentrically with the axis of the control shaft 29 in the annulus member 38 as indicated at 43. Thus, as the rotor 35 is oscillated and rotated, the intermediate member 42 is correspondingly rotated at the reduced speed. The intermediate member 42 is provided with an eccentric 44 upon which is rotatably mounted a rotor 46. The rotor 46 is provided with teeth 47 which mesh with another ring of teeth 48 in the annulus member 38. As the eccentric 44 is rotated, the rotor 46 is oscillated and, due to the meshing engagement of the teeth 47 and 48, the rotor 46 is also rotated. For example, the teeth 47 on the rotor 46 number 19 and the teeth 48 in the annulus member 38 number 20. By reason of these numbers of teeth, there is provided a speed reduction ratio between the eccentric 44 and the rotor 46 of 19 to 1. The two speed reduction effects are accumulative so that the total speed reduction ratio is 44 times 19 or 836 to 1. With the motor rotor sleeve shaft rotating at a speed of 3400 r.p.m., the rotor 46 would be rotated at substantially 4 r.p.m.

The rotor 46 is also provided with a plurality of holes 49 which receive pins 50 carried by an output member 52, the pins 50 being provided with antifriction sleeve rollers 51 operating in the holes 49. The holes 49 and pins 50 transmit rotary motion from the rotor 46 to the output member 52 in the same way that the holes 40 and pins 41 transmit rotary motion from the rotor 35 to the intermediate member 42. The output member 52 is provided with a sleeve extension 53 which is keyed to the control shaft 29 and held in place thereon by a snap ring 54. Since the shaft 29 is journalled for rotation in the intermediate member 42, the output member 52 is also journalled for rotation thereby. The device to be positioned such as the electrical potentiometer, variable resistance, variable condenser, switch, television tuner, or the like is connected to the extension 53 and, hence, to the control shaft 29.

Thus, as the motor 11 is operated in one direction or the other, the output member 53 is operated at a greatly reduced speed in said one direction or the other to correspondingly position the device to be positioned and to correspondingly position the dial 30 for indicating the position of the device being positioned. Since the connections between the output member 52 and its associated rotor 46 and between the intermediate member 42 and its associated rotor 35 are not rigid connections, transmission of shock loads from the output member 52 to the electric motor 11 are substantially eliminated. Since the differential gear reducer is concentric with the rotor sleeve shaft and since the control shaft 29 is also concentric thereto, the motorized dial control mechanism is extremely compact and simple in construction which would not be the case if the motive power were applied through a worm gear type of drive operating at right angles to the control shaft. The housing member 19 is provided with a cover member 56 which is held in place thereon as by crimping as indicated at 57, the cover member 56 operating to maintain the parts of the differential gear reducer in assembled relation.

As expressed above, the annulus member 38 is normally held against rotation in the housing member 19 and, toward this end, the annulus member 58 is provided with a plurality of circumferentially arranged notches 59 which are engaged by a ball 60 arranged within a tube 61 carried by the housing member 19. A spring 62 is arranged within the tube 61 beneath a screw 63 for the purpose of resiliently urging the ball 60 into the notches 59. The spring pressed ball 60 cooperating with the notches 59 provide a friction means for normally holding the annulus member stationary so as to render the differential gear reducer effective for power operating the output member 52 and, hence, the control shaft 29, as the electric motor 11 is operated in one direction or the other. If, however, it is desired to manually position the device being positioned by manually manipulating the knob 30, the force applied to the control shaft 29 and the output member 52 is transmitted through the differential gear reducer to cause the annulus member 38 to be rotated against the action of the friction means. In this way, the power operation of the dial control mechanism will be manually overridden by manipulating the knob 30 so as to manually position the device to be positioned. The notches 59 and ball 60 also operate as an indexing means for indexing the position of the annulus 38 and, hence, the position of the device to be positioned.

Referring now to FIGS. 6-9, another form of the motorized dial control mechanism is generally designated at 70. It includes an electric motor 71 having a field structure comprising laminations 72 carrying a coil 73. A bracket 74 is secured to one side of the laminations 72 and a bracket 76 having a cylindrical extension 77 is secured to the other side of the laminations 72. A motor rotor 78 is arranged within the laminations 72 and is carried by a hollow sleeve shaft 79 which is rotatably mounted in the bearing 75 and bracket 76 and sleeve extension 77. The motor is preferably a reversible electric motor and operates to rotate the sleeve shaft 79 in one direction or the opposite direction depending upon the character of energization of the coil of the electric motor.

A control shaft 80 is rotatably journalled in the motor sleeve shaft 79 and a washer 81 is press fit on the control shaft 80. A dial 82 is secured to the control shaft 80 adjacent the washer 81 as by a set screw 83, the dial 82 having graduations 84 thereon for indicating the rotative positions of the control shaft 80.

An annulus member 86 having a cylindrical extension 87 is rotatably mounted on the motor sleeve shaft 79 and it is normally held against rotation in a manner to be described hereafter. The motor sleeve shaft 79 has an eccentric 88 secured thereto upon which is rotatably mounted a rotor 89. The rotor 89 has a first ring of teeth 90 which mesh with teeth 91 formed in the annulus member 86 so that, as the rotor 89 is oscillated by the eccentric 88, it is also caused to rotate by the meshing interaction of the teeth 90 and 91. The rotor 89 also is provided with a ring of teeth 93 which mesh with teeth 94 formed in the output member 95 which is provided with a cylindrical extension 96, the output member 95 being rotatably mounted on the motor sleeve shaft 79. As the rotor 89 is oscillated and rotated in the manner described, the meshing of the teeth 93 and 94 also cause rotation of the output member 95. For purposes of illustration, it is assumed that the teeth 91 are 25 in number, the teeth 90 are 24 in number, the teeth 93 are 25 in number and the teeth 94 are 26 in number. These various numbers of teeth operate to provide a speed reduction ratio between the rotor sleeve shaft 71 and the output member 95 of 624 to 1.

A coupling member 98 is secured to the control shaft 80 as by a set screw 99 and is splined or keyed as indicated at 100 to the cylindrical extension 96 of the output member 95. The device to be positioned may be connected to the motorized dial control mechanism by means indicated at 101 and, hence, it is connected to the output member 95 and to the control shaft 80, the dial 82 indicating the position of the device to be positioned.

As expressed above, the annulus member 86 is normally held against rotation and this is accomplished by a spring clutch consisting of a coil spring 102 encompassing the cylindrical extensions 77 and 87 of the bracket 76 and the annulus member 86. If a force is applied to the annulus member 86 which has a tendency to wind the spring 102, the annulus member is prevented from rotating. However, if the force is in the opposite direction so as to tend to unwind the spring 102, the annulus member 86 is permitted to rotate. Thus, when the electric motor 71 is operated in a direction to apply said force in said first mentioned direction, the annulus member 86 is maintained stationary and the differential gear reducer operates to power rotate the control shaft 80. When, however, the control shaft 80 is manually manipulated in a direction which causes a force to be applied to the annulus member 86 in said opposite direction, the annulus member 86 is permitted to rotate so that the control shaft 80 may be manually manipulated to override the motorized operation of the differential gear reducer to manually position the device to be positioned. If it be desired to manually position the device in either direction, then the spring 102 may be formed relatively loose to permit movement of the annulus member 86 in either direction but still tight enough so that it will hold the annulus member stationary for normal loads on the control shaft 80 but allow slippage for abnormal loads as when the control shaft is manually manipulated.

In order to index the position of the device to be positioned, the outer periphery of the output member 95, which is formed of ferrous material, is provided with a plurality of circumferentially arranged bosses 104. A permanent magnet 105 is carried by the bracket 76 adjacent the bosses 104 so as to cause the magnetic attraction of the bosses as the bosses are aligned with the permanent magnet 105. Thus, the output member 95 is magnetically indexed.

Here, also, as in the form of the motorized dial control mechanism generally designated at 10, the concentric arrangement of the electric motor, control shaft and differential gear reducer provides for a compact, sturdy and efficient motorized dial control mechanism and, generally, the same results are provided by both types of mechanisms 10 and 70.

While, for purposes of illustration, two forms of this invention have been described, other forms thereof may

I claim as my invention:

1. A motorized dial control mechanism for positioning a device comprising, an electric motor having a hollow sleeve shaft rotated thereby, a rotatable control shaft extending through the sleeve shaft, a dial secured to the control shaft for manually rotating the control shaft and for indicating the rotative position thereof, a differential gear reducer concentrically arranged about the control shaft and including an input member carried by the sleeve shaft, a reaction member, and an output member secured to the control shaft and connected to the device to be positioned, and friction means associated with the reaction member for normally holding the reaction member stationary to allow the electric motor to position the device through the differential gear reducer and for permitting the reaction member to rotate when the control shaft is forcibly manually rotated by the dial to allow manual positioning of the device.

2. A motorized dial control mechanism for positioning a device comprising, a control shaft connected to the device to be positioned, a dial secured to the control shaft for manually rotating the control shaft and for indicating the rotative position thereof, an electric motor having a shaft rotated thereby, a differential gear reducer including an input member operated by the motor shaft, a reaction member, and an output member connected to the control shaft, and friction means associated with the reaction member for normally holding the reaction member stationary to allow the electric motor to position the device through the differential gear reducer and for permitting the reaction member to rotate when the control shaft is forcibly manually rotated by the dial to allow manual positioning of the device.

3. A motorized dial control mechanism for positioning a device comprising, an electric motor having a hollow sleeve shaft rotated thereby, a rotatable control shaft extending through the sleeve shaft, a dial secured to the control shaft for manually rotating the control shaft and for indicating the rotative position thereof, a differential gear reducer concentrically arranged about the control shaft and including an input member carried by the sleeve shaft, a reaction member, and an output member secured to the control shaft and connected to the device to be positioned, and friction means associated with the reaction member for normally holding the reaction member stationary to allow the electric motor to position the device through the differential gear reducer and for permitting the reaction member to rotate when the control shaft is forcibly manually rotated by the dial to allow manual positioning of the device, and indexing means associated with the differential gear reducer for positive positioning of the device to be positioned.

4. A motorized dial control mechanism for positioning a device comprising, a control shaft connected to the device to be positioned, a dial secured to the control shaft for manually rotating the control shaft and for indicating the rotative position thereof, an electric motor having a shaft rotated thereby, a differential gear reducer including an input member operated by the motor shaft, a reaction member, and an output member connected to the control shaft, and friction means associated with the reaction member for normally holding the reaction member stationary to allow the electric motor to position the device through the differential gear reducer and for permitting the reaction member to rotate when the control shaft is forcibly manually rotated by the dial to allow manual positioning of the device, and indexing means associated with the differential gear reducer for positive positioning of the device to be positioned.

5. A motorized dial control mechanism for positioning a device comprising, an electric motor having a hollow sleeve shaft rotated thereby, a rotatable control shaft extending through the sleeve shaft, a dial secured to the control shaft for manually rotating the control shaft and for indicating the rotative position thereof, a differential gear reducer concentrically arranged about the control shaft and including an input member carried by the sleeve shaft, a reaction member, and an output member secured to the control shaft and connected to the device to be positioned, and friction means associated with the reaction member for normally holding the reaction member stationary to allow the electric motor to position the device through the differential gear reducer and for permitting the reaction member to rotate when the control shaft is forcibly manually rotated by the dial to allow manual positioning of the device, said friction means including indexing means for positive positioning of the device to be positioned.

6. A motorized dial control mechanism for positioning a device comprising, a control shaft connected to the device to be positioned, a dial secured to the control shaft for manually rotating the control shaft and for indicating the rotative position thereof, an electric motor having a shaft rotated thereby, a differential gear reducer including an input member operated by the motor shaft, a reaction member, and an output member connected to the control shaft, and friction means associated with the reaction member for normally holding the reaction member stationary to allow the electric motor to position the device through the differential gear reducer and for permitting the reaction member to rotate when the control shaft is forcibly manually rotated by the dial to allow manual positioning of the device, said friction means including indexing means for positive positioning of the device to be positioned.

7. A motorized dial control mechanism for positioning a device comprising, an electric motor having a hollow sleeve shaft rotated thereby, a rotatable control shaft extending through the sleeve shaft, a dial secured to the control shaft for manually rotating the control shaft and for indicating the rotative position thereof, a differential gear reducer concentrically arranged about the control shaft and including an input member carried by the sleeve shaft, a reaction member, and an output member secured to the control shaft and connected to the device to be positioned, and friction means associated with the reaction member for normally holding the reaction member stationary to allow the electric motor to position the device through the differential gear reducer and for permitting the reaction member to rotate when the control shaft is forcibly manually rotated by the dial to allow manual positioning of the device, and indexing means associated with the output member of the differential gear reducer for positive positioning of the device to be positioned.

8. A motorized dial control mechanism for positioning a device comprising, a control shaft connected to the device to be positioned, a dial secured to the control shaft for manually rotating the control shaft and for indicating the rotative position thereof, an electric motor having a shaft rotated thereby, a differential gear reducer including an input member operated by the motor shaft, a reaction member, and an output member connected to the control shaft, and friction means associated with the reaction member for normally holding the reaction member stationary to allow the electric motor to position the device through the differential gear reducer and for permitting the reaction member to rotate when the control shaft is forcibly manually rotated by the dial to allow manual positioning of the device, and indexing means associated with the output member of the differential gear reducer for positive positioning of the device to be positioned.

9. A motorized dial control mechanism for positioning a device comprising, a reversible electric motor having a hollow sleeve shaft rotated thereby, a rotatable control shaft extending through the sleeve shaft, a dial secured to the control shaft for manually rotating the control shaft and for indicating the rotative position thereof, a differential gear reducer concentrically arranged about the control shaft and including an input member carried by the sleeve shaft, a reaction member, and an output member secured to the control shaft and connected to the device to be positioned, and friction means associated with the reaction member for normally holding the reaction member stationary to allow the reversible electric motor to position the device in one direction or the opposite direction through the differential gear reducer and for permitting the reaction member to rotate in one direction or the opposite direction when the control shaft is forcibly manually rotated by the dial in said one direction or opposite direction to allow manual positioning of the device.

10. A motorized dial control mechanism for positioning a device comprising, a control shaft connected to the device to be positioned, a dial secured to the control shaft for manually rotating the control shaft and for indicating the rotative position thereof, a reversible electric motor having a shaft rotated thereby, a differential gear reducer including an input member operated by the motor shaft, a reaction member, and an output member connected to the control shaft, and friction means associated with the reaction member for normally holding the reaction member stationary to allow the reversible electric motor to position the device in one direction or the opposite direction through the differential gear reducer and for permitting the reaction member to rotate in one direction or the opposite direction when the control shaft is forcibly manually rotated by the dial in said one direction or opposite direction to allow manual positioning of the device.

11. A motorized dial control mechanism for positioning a device comprising, a control shaft connected to the device to be positioned, a dial secured to the control shaft for manually rotating the control shaft and for indicating the rotative position thereof, an electric motor having a shaft rotated thereby, a differential gear reducer including an input member operated by the motor shaft, a reaction member, and an output member connected to the control shaft, and friction means associated with the reaction member for normally holding the reaction member stationary to allow the electric motor to position the device through the differential gear reducer and for permitting the reaction member to rotate when the control shaft is forcibly manually rotated by the dial to allow manual positioning of the device, and magnetic indexing means including a permanent magnet associated with the differential gear reducer for positive positioning of the device to be positioned.

12. A motorized dial control mechanism for positioning a device comprising, an electric motor having a hollow sleeve shaft rotated thereby, a rotatable control shaft extending through the sleeve shaft, a dial secured to the control shaft for manually rotating the control shaft and for indicating the rotative position thereof, a differential gear reducer concentrically arranged about the control shaft and including an input member carried by the sleeve shaft, a reaction member, and an output member secured to the control shaft and connected to the device to be positioned, and friction means associated with the reaction member for normally holding the reaction member stationary to allow the electric motor to position the device through the differential gear reducer and for permitting the reaction member to rotate when the control shaft is forcibly manually rotated by the dial to allow manual positioning of the device, and magnetic indexing means including a permanent magnet associated with the differential gear reducer for positive positioning of the device to be positioned.

References Cited in the file of this patent

UNITED STATES PATENTS

| | | |
|---|---|---|
| 2,063,340 | Ruben | Dec. 8, 1936 |
| 2,151,534 | Scofield | Mar. 21, 1939 |
| 2,170,951 | Perry | Aug. 29, 1939 |
| 2,658,395 | Coates | Nov. 10, 1953 |